United States Patent
Brunou et al.

(10) Patent No.: US 8,688,310 B2
(45) Date of Patent: Apr. 1, 2014

(54) METHOD AND DEVICE FOR MONITORING THAT A VEHICLE IN STANDBY MODE IS CORRECTLY IMMOBILIZED FOR TRANSPORT, AND VEHICLE EQUIPPED WITH SUCH A DEVICE

(75) Inventors: Alfred Brunou, Saint-Gemme-Moronval (FR); Stephane Nicolle, Montigny-le-Bretonneux (FR)

(73) Assignee: Renault S.A.S., Guyancourt (FR)

( * ) Notice: Subject to any disclaimer, the term of this patent is extended or adjusted under 35 U.S.C. 154(b) by 79 days.

(21) Appl. No.: 13/382,604

(22) PCT Filed: Jul. 5, 2010

(86) PCT No.: PCT/FR2010/051407
§ 371 (c)(1),
(2), (4) Date: Feb. 8, 2012

(87) PCT Pub. No.: WO2011/004106
PCT Pub. Date: Jan. 13, 2011

(65) Prior Publication Data
US 2012/0158239 A1    Jun. 21, 2012

(30) Foreign Application Priority Data

Jul. 6, 2009 (FR) .................................... 09 54651

(51) Int. Cl.
*G01M 17/007* (2006.01)
(52) U.S. Cl.
USPC .............. 701/29.1; 188/265; 303/89; 70/202; 70/200
(58) Field of Classification Search
USPC ................................ 70/200; 188/265; 303/89
See application file for complete search history.

(56) References Cited

U.S. PATENT DOCUMENTS 6,158,826 A * 12/2000 Yasuda .......................... 303/191
6,647,328 B2 * 11/2003 Walker ............................. 701/36

(Continued)

FOREIGN PATENT DOCUMENTS

DE    198 22 014      11/1998
DE    19822014    * 11/1998

(Continued)

OTHER PUBLICATIONS

U.S. Appl. No. 13/382,310, filed Feb. 24, 1012, Brunou, et al.

(Continued)

*Primary Examiner* — John R Olszewski
*Assistant Examiner* — Jean-Paul Cass
(74) *Attorney, Agent, or Firm* — Oblon, Spivak, McClelland, Maier & Neustadt, L.L.P.

(57) ABSTRACT

A method for monitoring that a vehicle on standby has been correctly immobilized for transport, the vehicle including a course control device, wheel speed sensors, a yaw speed sensor, a processing unit processing information managing operation modes of the vehicle, and a device for immobilizing the vehicle. The method includes detecting the vehicle is in a standby mode at a standstill following installing of the vehicle on a transport support, detecting a non-zero vehicle speed through the speed sensors of at least two wheels over a defined period, detecting a non-zero yaw speed through the yaw speed sensor, over a predefined period, and under these conditions determining a mode whereby immobilization of the vehicle for transport is monitored, in which mode information from at least the wheel speed sensors is filtered after a determined number of attempts at immobilizing the vehicle and allowing the vehicle to be fired up.

10 Claims, 2 Drawing Sheets

(56) References Cited

U.S. PATENT DOCUMENTS

| | | |
|---|---|---|
| 6,690,260 B1 * | 2/2004 | Ashihara .................. 340/5.8 |
| 7,272,469 B2 * | 9/2007 | Kalau et al. ................. 701/1 |
| 7,463,953 B1 * | 12/2008 | Lee et al. ..................... 701/1 |
| 7,535,345 B2 * | 5/2009 | Tanaka et al. .............. 340/429 |
| 7,992,691 B2 * | 8/2011 | Maron et al. ............... 188/156 |
| 8,397,879 B2 * | 3/2013 | Maron et al. .............. 188/72.1 |
| 2006/0219048 A1 * | 10/2006 | Ueno ............................ 74/560 |
| 2006/0244577 A1 * | 11/2006 | Tanaka et al. ............. 340/429 |
| 2006/0255119 A1 * | 11/2006 | Marchasin et al. .......... 235/375 |
| 2007/0168104 A1 * | 7/2007 | Nelson et al. ................ 701/93 |
| 2008/0319589 A1 * | 12/2008 | Lee et al. ..................... 701/1 |
| 2009/0158790 A1 * | 6/2009 | Oliver ......................... 70/202 |
| 2011/0278105 A1 * | 11/2011 | Maron et al. .............. 188/72.1 |
| 2012/0143396 A1 * | 6/2012 | Brunou et al. ................. 701/1 |

FOREIGN PATENT DOCUMENTS

| | | |
|---|---|---|
| DE | 10 2005 015062 | 2/2006 |
| DE | 10 2005 045998 | 5/2006 |
| FR | 2 845 335 | 4/2004 |
| FR | 2 906 515 | 4/2008 |
| WO | 2008 003533 | 1/2008 |

OTHER PUBLICATIONS

French Search Report Issued Feb. 25, 2010 in FR 0954651 Filed Jul. 6, 2009.

International Search Report Issued Nov. 5, 2010 in PCT/FR10/51407 Filed Jul. 5 2010.

* cited by examiner

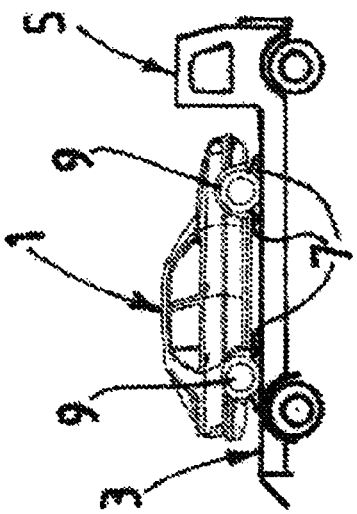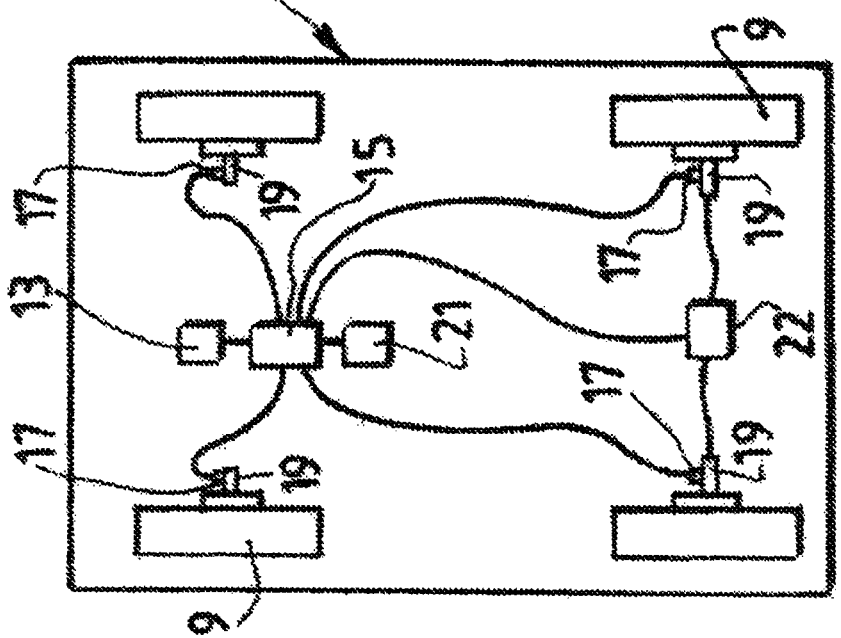

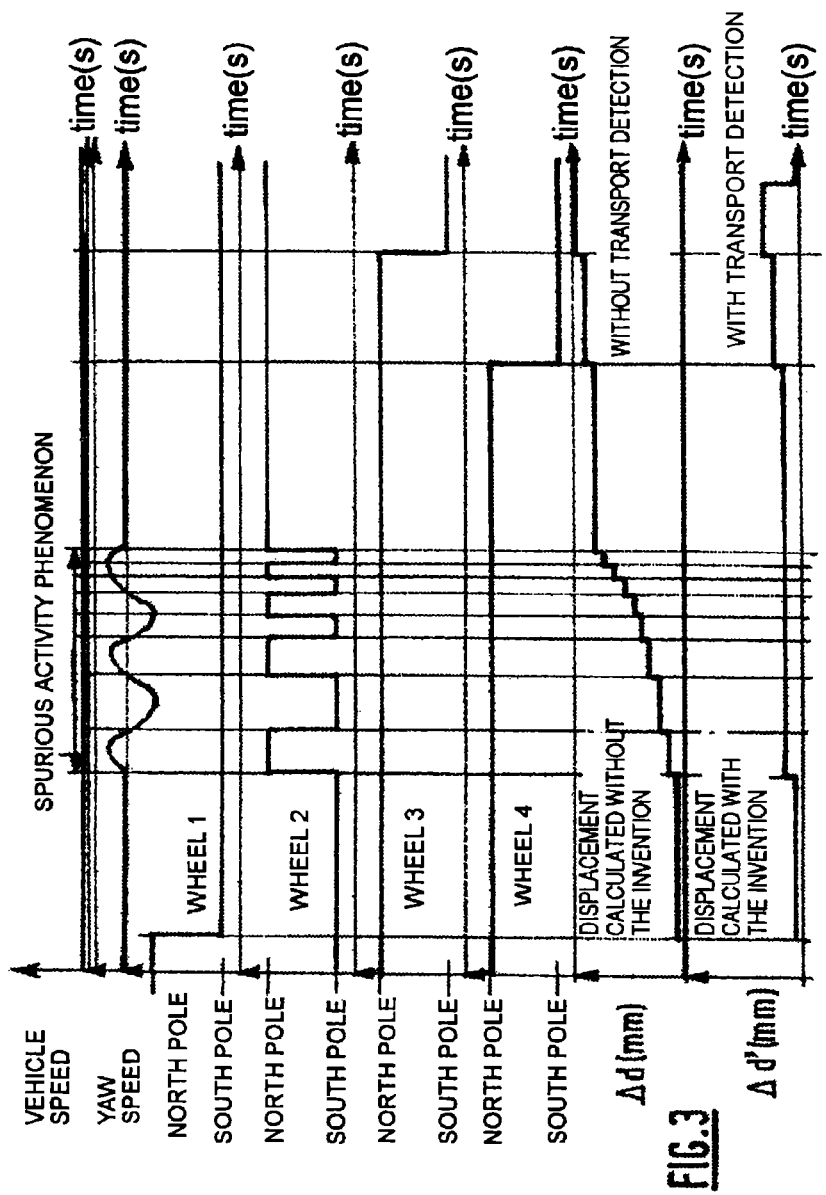

METHOD AND DEVICE FOR MONITORING THAT A VEHICLE IN STANDBY MODE IS CORRECTLY IMMOBILIZED FOR TRANSPORT, AND VEHICLE EQUIPPED WITH SUCH A DEVICE

BACKGROUND

When a vehicle is immobilized in standby mode, a system monitors the activity of the wheel speed sensors in order to check that the vehicle is correctly immobilized before the latter is switched off. When the vehicle is equipped with a course control system, for example of E.S.C. (vehicle stability control) type and when movements are detected via the wheel speed sensors, said course control system informs the immobilizing device accordingly: inducing either an immobilizing of the vehicle by means of an increase in the tightening forces of the immobilizing device (parking brake) or dedicated alerts/defects. This essential monitoring reaches its limits in transport, where the vehicle may seem to be displaced relative to the transport carrier without in any way actually being displaced. This is because, during transport, spurious activities of the wheel speed sensors may be wrongly generated and thus the immobilizing device may be required to increase the tightening forces of the immobilizing device, thus possibly resulting in defects requiring a diagnostic-based technical intervention.

The object of the invention is therefore to avoid unnecessary immobilizing actions of the immobilizing device and/or untimely vehicle alerts or defects following transportation.

BRIEF SUMMARY

Furthermore, it may be that the vehicle is badly chocked on its transport carrier and moves slightly thereon, for example by a few centimeters.

The invention aims to remedy this situation by retightening the immobilizing device sufficiently without going as far as the maximum tightness, then setting the vehicle to defect mode.

According to the invention, there is proposed a method for monitoring that a vehicle in standby mode is correctly immobilized for transport following the installation of the latter on a transport carrier, the vehicle including a course control device, wheel speed sensors and a vehicle yaw speed sensor linked to said course control device of the vehicle, a detected information processing unit, of on-board computer type, managing in particular modes of operation of the vehicle, such as vehicle switched off, on standby, ready to start, starting, engine started, and a vehicle immobilizing device, characterized in that it comprises the following steps:
  detecting a standby mode of operation of the vehicle when stopped following the installation of the vehicle fixed on a transport carrier,
  detecting a zero speed of the vehicle, recorded by the wheel speed sensors of the vehicle following said installation of the vehicle on the transport carrier, over a predefined time period,
  detecting a non-zero yaw speed of the vehicle, recorded by the yaw speed sensor of the vehicle, corresponding to the relative movement of the vehicle fixed on its carrier, over a predefined time period,
  detecting a non-zero speed of the vehicle on at least two wheels of the vehicle over a determined time period and over a low displacement amplitude,
  under these conditions, determining a mode for transport and for monitoring the correct immobilization for transport of the vehicle, stored by said information processing unit, in which said course control device orders the retightening of the vehicle immobilizing device at least once in order to immobilize the vehicle and disables the control in order to avoid producing unnecessary tightening forces of the vehicle immobilizing device resulting, for example, in defects requiring a diagnostic-based technical intervention, and
  allowing for an exit from the mode for transport and for monitoring the correct immobilization of the vehicle and the standby mode, corresponding to the vehicle being switched on again, produced for example by a door being opened or the vehicle being moved.

The method applies to various vehicle transport situations, for example to road transport on a truck, rail transport, transport on a ferry, impounding of the vehicle, etc., and, in this transport situation, makes it possible to have the vehicle in a mode for monitoring displacement of the vehicle on its transport carrier and inhibiting any false displacement detection, thus avoiding it being set to defect mode.

Naturally, the standby mode of the vehicle remains for a determined time period after the vehicle is stopped, on the transport carrier. The time period may be of the order of from a few minutes to sixty minutes.

Said predefined time period for detecting the zero speed of the vehicle is of the order of a few seconds, for example from one to three seconds.

Said predefined time period of the non-zero yaw speed of the vehicle is of the order of a few seconds, for example from one to several seconds. This period may correspond to a turning vehicle transport situation.

Said determined time period of the non-zero speed of the vehicle on at least two wheels is of the order of a few seconds, for example from one to three seconds.

This period may correspond to a turbulent vehicle transport situation.

Said low displacement amplitude of the at least two wheels at non-zero speed of the vehicle is of the order of 0.5 to 10 centimeters. This amplitude may correspond to the movement of the vehicle relative to its fixing chocks on the transport carrier, parking brake badly tightened.

Furthermore, said order to retighten the immobilizing device is carried out a limited number of times, at most three to four times.

The device for monitoring that a vehicle in standby mode is correctly immobilized for transport for implementing the method defined previously comprises vehicle wheel speed sensors, a vehicle yaw speed sensor, a vehicle course control device, for example of E.S.C. (vehicle stability control) type, an information processing unit of computer type on board the vehicle suitable for managing in particular modes of operation of the vehicle, such as vehicle switched off, on standby, ready to start, starting, engine started, and is characterized in that it comprises means suitable for detecting the vehicle in a mode for transport and for monitoring that the vehicle is correctly immobilized for transport, stored by said information processing unit, in which said course control device orders the retightening of the vehicle immobilizing device at least once and a limited number of times in order to immobilize the vehicle, and disables the control in order to avoid producing unnecessary tightening forces of the vehicle immobilizing device and causing defects requiring a diagnostic-based technical intervention, and for enabling the vehicle to be switched on again, for example when a door is opened or when said vehicle is moved, etc.

Said means suitable for detecting the vehicle in transport mode while maintaining the monitoring of the immobilization of the vehicle are advantageously a software element added to the software of the course control device of the vehicle.

The invention also relates to a vehicle comprising a device for monitoring that a vehicle in standby mode is correctly immobilized for transport as mentioned above.

BRIEF DESCRIPTION OF THE DRAWINGS

The invention is illustrated hereinbelow using an exemplary nonlimiting embodiment of the invention and with reference to the appended drawings in which:

FIG. 1 is a schematic view of the components of a detection device of a motor vehicle according to the invention in a transport situation, FIG. 2 is an elevation view of a motor vehicle according to the invention in a transport situation on a deck of a transport vehicle, and FIG. 3 is a graph of the signals from the wheel speed, yaw and vehicle displacement sensors in a transport situation for a motor vehicle according to the invention and a vehicle without the invention.

DETAILED DESCRIPTION

With reference to the drawings, and in particular to FIG. 2, a motor vehicle 1 according to the invention in a transport situation is represented. This vehicle is mounted on a deck 3 of a transport vehicle 5, a truck, being fixed thereto by means of front and rear chocks 7 positioned against its wheels 9 on the deck 3.

In addition to the chocking of the vehicle, said vehicle is placed in a parking brake situation, by the vehicle immobilizing device 22. It may be that the vehicle is badly chocked on its transport carrier and moves slightly thereon, for example from 0.5 to a few centimeters at the most turbulent transport moments, notably if the parking brake is badly tightened.

Furthermore, during transport, notably during turning, the motor vehicle 1 undergoes a yaw movement, which is detected by the yaw speed sensor 13 of the vehicle (FIG. 1).

This motor vehicle 1 is also provided with a vehicle course control device 15, of E.S.C. (vehicle stability control) type. The vehicle also comprises wheel speed sensors 17 each mounted on a wheel axle 19 of the vehicle and linked to the course control device 15, which is in turn linked to a computer 21 on board the vehicle and to a vehicle immobilizing device 22. Similarly, the yaw speed sensor 13, mounted inside the vehicle, is linked to the course control device 15.

In this transport situation and without the device of the invention, the wheel speed sensors 17 will record movements of the vehicle and the E.S.C. (vehicle stability control) device 15 will inform the vehicle immobilizing device 22 causing the latter to produce parking brake tightening forces up to the maximum tightness, then, with the vehicle seeming to continue to move on its carrier during transport, will cause, on the part of the vehicle immobilizing device 22, defects requiring a diagnostic-based technical intervention.

The invention provides a solution to this problem regarding modern motor vehicles in a transport situation.

The invention in fact relates to the motor vehicles that include (FIG. 1) wheel speed sensors 17, a sensor 17 on each wheel, a vehicle yaw speed sensor 13, a vehicle course control device 15, of E.S.C. (vehicle stability control) type, and an information processing unit 21 of computer type on board the vehicle. The on-board computer 21 is linked to the course control device 15. The wheel speed sensors 17 and the yaw speed sensor 13 are linked to the course control device 15.

The computer 21 on board the vehicle is suitable for managing and informing of the operation of the vehicle and notably various operating modes thereof, such as vehicle switched-off mode in which the vehicle is stopped with its control elements off and in a standby electric power supply mode, a vehicle standby mode in which essential control elements, such as the detection of a door being opened, the detection of movement of the vehicle, etc., are maintained, a vehicle ready-to-start mode in which the starting card or the vehicle contact key is detected, an engine starting mode in which the starting card or the contact key is activated, an engine started mode in which the corresponding driving and control functions are activated.

The invention consists in detecting, for a vehicle 1 in standby mode, a transport situation in which a non-zero speed of the vehicle on at least two wheels of the vehicle is detected over a determined time period and over a low displacement amplitude, which corresponds to a poor immobilization of the vehicle on the transport carrier. Initially, it enables the vehicle immobilizing device to retighten the parking brake in particular as far as immobilization of the vehicle but, in a case where it is really impossible to immobilize, to continue the detection of displacement and thus allow appropriate alerts to be raised.

The implementation of the invention is illustrated by an exemplary embodiment described below.

It is assumed that an operator mounts a modern motor vehicle 1, equipped with an on-board computer 21, an E.S.C. (vehicle stability control) device 15, wheel speed sensors 17 and a vehicle yaw speed sensor 13, on a deck 3 of a transport vehicle 5 as represented in FIG. 2 and fixes it in position, for example by means of chocks 7 on the carrier deck 3, and that the vehicle immobilizing device 22 insufficiently tightens the parking brake of the vehicle. The vehicle 1 is held locked on the deck of the transport vehicle with a slight possible travel corresponding to the poor fixing thereof on the carrier deck and it may move relative thereto by 0.5 to a few centimeters.

The vehicle is also kept in standby mode for a variable time period, from a few minutes to approximately 60 minutes depending on the static conditions of the vehicle at the moment when the latter is stopped on the deck 3. The operator starts his transport vehicle 5 and transports the vehicle 1 in this standby period of the vehicle 1; the transported motor vehicle 1 will be controlled by its E.S.C. (vehicle stability control) device 15 and in particular for its displacement and yaw movements by the wheel speed 17 and yaw speed 13 sensors respectively during transport.

If two or more wheel speed sensors 17 deliver a speed signal corresponding to the very slight displacement of the motor vehicle on the deck 3, at the most turbulent transport moments, for example over one to several seconds, then, over prolonged periods, for example from five to fifteen minutes in which the transport is more calm, they no longer deliver any, this situation will be recognized by the E.S.C. (vehicle stability control) device 15 as zero speed of the vehicle during said period of turbulence.

Furthermore, the yaw speed sensor 13 of the vehicle 1 will be required to react during transport, in particular in the turn situations, to emit a non-zero vehicle yaw speed signal, and to do so over a short period of time corresponding to the time of the turn, of a few seconds, for example from one to several seconds.

The abovementioned conditions will be recognized by the E.S.C. (vehicle stability control) device 15 in the standby mode condition received from the on-board computer 21 as a situation for transport and for monitoring the correct immobilization of the vehicle, in which said course control device 15 informs the vehicle immobilizing device 22 which orders the retightening of the parking brakes, in order to immobilize the vehicle. The retightening may be done from one to several times, two to four times, in order to obtain the immobilization of the vehicle and then a filtering of the information is carried out by the E.S.C. (vehicle stability control) device 15 in order to prevent the vehicle immobilizing device 22 from producing unnecessary parking brake tightening forces and then causing defects of the motor vehicle 1.

This situation is illustrated by FIG. 3 in which a graphic comparison is recorded between a vehicle 1 according to the invention and a vehicle not equipped with the invention during transport.

This graph expresses, as a function of time (on the x axis), respectively from top to bottom, the vehicle speed and vehicle yaw speed signals, the speed signals from the wheel speed sensors 17, the displacement Δd of the vehicle 1 (in mm) calculated without the device of the invention and the calculated displacement Δd' (in mm) of the vehicle with the device of the invention.

The graph shows a vehicle transport in which, from a zero speed of the vehicle over a prolonged period, for example ten transport minutes, a phenomenon of activities is observed over a short period of time, of the order of a few seconds, and there appears, from the top of the graph to the bottom, a non-zero speed of the vehicle, a non-zero yaw speed of the vehicle, the emission of speed signals for the wheels 1 to 4 from the speed sensors 17 over said period, the corresponding calculated displacement Δd of a vehicle without the method according to the invention over said period, and the calculated displacement Δd' reset to zero over said period of a vehicle implementing a method according to the invention.

Naturally, for the vehicle not equipped with the invention, the staircase-form calculated displacement is wrongly translated as a real displacement of the vehicle, which will result in a retightening of the parking brakes followed by a setting of the vehicle to defect mode ordered by the immobilizing device 22.

In the vehicle using the method according to the invention, the calculated displacement Δd' integrates the movement of the wheel 1, of the wheel 2 (once), of the wheel 3 and of the wheel 4, and does not include the spurious movements, detected by the sensors 17 of the wheel 2 in oscillation.

Naturally, at the end of the vehicle transport situation, when a door thereof is opened, or when the vehicle really moves, the vehicle exits from the transport and immobilization monitoring mode.

The invention thus provides a simple method and device for detecting a vehicle in a transport situation, making it possible to prevent the latter from being set to defect mode during this situation.

The invention claimed is:

1. A method for monitoring that a vehicle in standby mode is correctly immobilized for transport following installation of the vehicle on a transport carrier, the vehicle including a course control device, wheel speed sensors and a vehicle yaw speed sensor linked to the course control device of the vehicle, a detected information processing unit, of on-board computer type, managing modes of operation of the vehicle, and a vehicle immobilizing device, the method comprising:

detecting a standby mode of operation of the vehicle when stopped via the vehicle immobilizing device following installation of the vehicle fixed on a transport carrier;

detecting a speed of the vehicle, recorded by the wheel speed sensors of the vehicle following the installation of the vehicle on the transport carrier;

detecting a yaw speed of the vehicle, recorded by the yaw speed sensor of the vehicle, corresponding to relative movement of the vehicle fixed on the transport carrier;

retightening of the vehicle immobilizing device at least once to immobilize the vehicle when the detecting the speed of the vehicle detects a non-zero speed over a predefined time period or the detecting the yaw speed of the vehicle detects a non-zero yaw speed over a predefined time period;

after the retightening of the vehicle immobilizing device at least once to immobilize the vehicle, preventing further retightening of the vehicle immobilizing device when the detecting the speed of the vehicle detects subsequent non-zero speeds or the detecting the yaw speed of the vehicle detects subsequent non-zero yaw speeds to avoid producing additional tightening forces of the vehicle immobilizing device; and exiting from the standby mode, corresponding to the vehicle being switched on again.

2. The monitoring method as claimed in claim 1, wherein the standby mode of the vehicle remains for a determined time period after the vehicle is stopped on the transport carrier.

3. The monitoring method as claimed in claim 1, wherein the predefined time period of the non-zero yaw speed of the vehicle is from one to several seconds.

4. The monitoring method as claimed in claim 1, wherein the predefined time period of the non-zero speed of the vehicle on at least two wheels is from one to three seconds.

5. The monitoring method as claimed in claim 1, wherein the exiting includes exiting from the standby mode when a door of the vehicle is opened.

6. The monitoring method as claimed in claim 1, wherein the retightening includes retightening of the vehicle immobilizing device at most four times to immobilize the vehicle.

7. A device for monitoring that a vehicle in standby mode is correctly immobilized for transport, comprising:

a vehicle immobilizing device configured to immobilize wheels of the vehicle;

vehicle wheel speed sensors configured to detect a speed of the wheels of the vehicle;

a vehicle yaw speed sensor configured to detect a yaw speed of the vehicle;

a vehicle course control device configured to control the vehicle immobilizing device; and an information processing unit on board the vehicle configured to manage modes of operation of the vehicle including setting the vehicle in the standby mode when the vehicle is stopped via the vehicle immobilizing device following installation of the vehicle fixed on a transport carrier, wherein the course control device is configured to order retightening of the vehicle immobilizing device at least once to immobilize the vehicle when the vehicle wheel speed sensors detect the speed of the vehicle is a non-zero speed or the vehicle yaw speed sensor detects the yaw speed of the vehicle is a non-zero yaw speed, and after the retightening of the vehicle immobilizing device at least once to immobilize the vehicle, the course control device is configured to prevent ordering further retightening of the vehicle immobilizing device when the vehicle wheel speed sensors detect subsequent non-zero speeds or the vehicle yaw speed sensor detects subsequent non-zero yaw speeds to avoid producing additional vehicle brake tightening forces.

8. A vehicle, comprising:
a device for monitoring that the vehicle in standby mode is correctly immobilized for transport as claimed in claim 7.

9. The monitoring device as claimed in claim 7, wherein the information processing unit is configured to enable the vehicle to be switched on again when a door of the vehicle is opened or when the vehicle is moved from the transport carrier.

10. The monitoring device as claimed in claim 7, wherein the course control device is configured to order retightening of the vehicle immobilizing device at most four times to immobilize the vehicle.

\* \* \* \* \*